S. Vanstone,
Chain Link.
N° 70,380.   Patented Oct. 29, 1867.
Fig. 1.
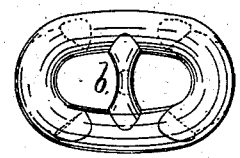
Fig. 2.          Fig. 3.
   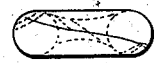
Fig. 4.          Fig. 5.
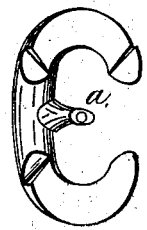   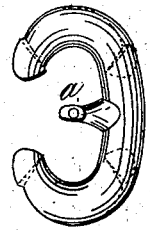
Witnesses:
W. B. Vincent,
W. W. Rickard.
Inventor,
Samuel Vanstone

United States Patent Office.

SAMUEL VANSTONE, OF PROVIDENCE, RHODE ISLAND, ASSIGNOR TO HIMSELF AND JOHN STEWART, OF SAME PLACE.

Letters Patent No. 70,380, dated October 29, 1867.

IMPROVEMENT IN CONNECTING-LINK FOR CHAINS.

*The Schedule referred to in these Letters Patent and making part of the same.*

TO ALL WHOM IT MAY CONCERN:

Be it known that I, SAMUEL VANSTONE, of the city and county of Providence, in the State of Rhode Island, have invented a new and useful Improvement in Connecting-Links; and I do hereby declare that the following specification, taken in connection with the drawings, making a part of the same, is a full, clear, and exact description thereof.

The improvement herein described relates to that class of links employed in emergencies for repairing broken chains, which are made in two halves and held together by a rivet. Several devices of the same general character as this have been long known, and one in particular is described in the Letters Patent granted to C. T. E. Thompson, of Providence, Rhode Island, August 5, 1862. I propose, therefore, to confine myself to the special novelties of construction which distinguish this link from others made in two halves which have preceded it.

In Thompson's link above referred to it is necessary to close four rivets before the parts can be securely held together. In many situations where a chain requires repair, as, for instance, in case of the breaking of the topping-lift of a vessel, the inconvenience attendant upon riveting so great a number of connecting-pins is of much consequence, and seriously depreciates the value of the device. In my invention only one pin is required to be riveted to unite firmly the two parts which compose the link.

In the accompanying drawings it will be seen that each division of the link is provided with a central tongue, $a$, figs. 4 and 5, the ends of which for the halves pertaining to any one link are chamfered at a convenient angle upon opposite sides respectively, so that when the two parts are brought into the proper relations such tongues will overlap at the end, and form a connecting cross-bar $b$, fig. 1. Projecting from the portion so chamfered of one of the tongues, and at right angles with its axis, is a rivet-pin, and at a corresponding point upon the tongue of the other portion is a hole for the entrance of the same. The faces of the two parts of the link which are to coincide should be made irregular, as shown in the drawings, or with suitable elevations upon the one side fitting corresponding depressions upon the other, sufficient in number, and with such variety of disposition, that the two halves of the link when placed together will be held by the contact of such irregular surfaces from moving over each other. All that becomes necessary, then, to complete the link is to close down the central rivet which unites the parts of the cross-bar.

What I claim as my invention, and desire to secure by Letters Patent, is—

The improvement in connecting-links described, which consists in making each division of the link with a central tongue, $a$, which tongues, when overlapped, by placing the two parts of the link together, and uniting the same by a rivet, will form a cross-bar, $b$, substantially as described for the purposes specified.

SAMUEL VANSTONE.

Witnesses:
    W. B. VINCENT,
    W. W. RICKARD.